Aug. 13, 1935.    E. H. LAND    2,011,553
PROCESS OF FORMING A POLARIZING BODY
Filed June 7, 1933
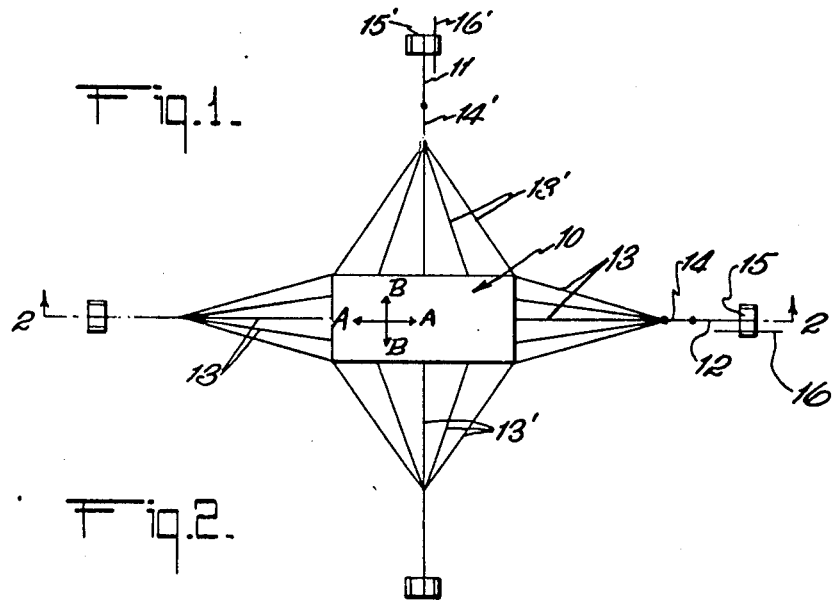
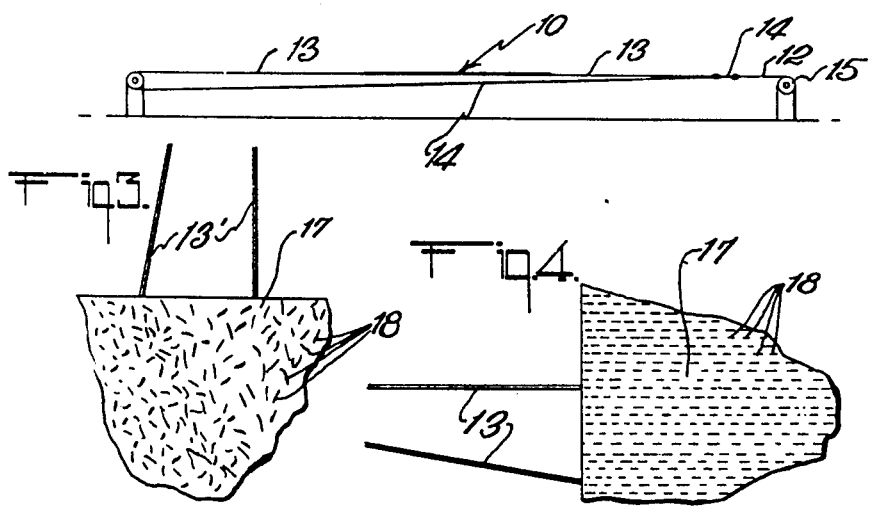
INVENTOR
Edwin Herbert Land
BY
Warfield & Brown
ATTORNEYS Patented Aug. 13, 1935

2,011,553

UNITED STATES PATENT OFFICE 2,011,553

PROCESS OF FORMING A POLARIZING BODY

Edwin H. Land, Wellesley Farms, Mass., assignor to Sheet Polarizer Company, Inc., Union City, N. J., a corporation of New Jersey Application June 7, 1933, Serial No. 674,620

18 Claims. (Cl. 18—57)

This invention relates to a process of orienting asymmetric particles suspended in a suitable medium, which comprises subjecting said medium and the suspended particles to a stretching action.

In general it is an object of the invention to provide a method of the character described which will efficiently accomplish the results desired, which is simple and economical in its requirements of apparatus and material, and which can be conveniently executed.

Another object of the invention is to provide a method of orienting units in a medium by the application of a uniform pure stretch without subjecting them to the forces of shear.

Another object is to provide a method for permanently orienting an assemblage of suspended asymmetric colloidal particles.

Another object is to provide a method for producing a polarizing body, comprising a suitable transparent suspending medium in which asymmetric polarizing particles have been permanently embedded, in which a substantially uniform orientation of the polarizing axes of said particles is secured by subjecting said suspension to a substantially uniform pure stretch.

Other objects of the invention will in part be obvious and will in part appear hereinafter.

This application is a continuation in part of my copending application Serial No. 626,250, filed July 29, 1932.

The invention accordingly comprises the several steps and the relation and order of one or more of such steps with respect to each of the others which are exemplified in the following detailed disclosure and the scope of the application of which will be indicated in the claims.

For a fuller understanding of the nature and objects of the invention reference should be had to the following detailed description taken in connection with the accompanying drawing in which:

Figure 1 is a plan view of an apparatus adapted for performing the process of the invention;

Fig. 2 is a cross-section of the device shown in Fig. 1, taken along the lines 2—2 in Fig. 1;

Fig. 3 is a diagrammatic view with the elements greatly enlarged, illustrating the condition of the material when it is first applied to the device shown in Fig. 1 and before it has been operated upon; and Fig. 4 is a similar view illustrative of the condition of the material after it has been subjected to the process of the invention.

In my said copending application Serial No. 626,250 I describe a method of orienting asymmetric particles, which comprises extruding a plastic mass in which said particles have been distributed and embedded through a suitable orifice, under such conditions that the mass containing the particles is protected from contact with the edges of the orifice by adjacent continua, preferably of substantially the same material as that forming the plastic mass containing the asymmetric particles. During the extrusion I described in said application, the particles contained in the plastic mass are oriented so that their axes lie in substantial parallelism. Where polarizing particles are employed, as, for example, asymmetric particles of herapathite, and where only one variety of the polarizing particles is used, the effect of the extrusion is to align the particles with their polarizing axes in substantial parallelism. If the extruded material is then set or hardened a sheet-like body is produced having excellent light-polarizing properties.

This invention contemplates the production of a somewhat similar body by different means, and more specifically contemplates the production of a light-polarizing body comprising a suitable transparent suspending medium in which a mass of asymmetric polarizing particles have been dispersed and embedded, and which has been subjected to a substantially uniform pure stretching action to orient the particles.

In Figs. 1 and 2 is illustrated an apparatus suitable for performing the process of the invention, which comprises a resilient bed or deposit floor 10, preferably comprising a sheet of rubber which may be suitably fastened to the cables 11 and 12 by the connecting members 13 and 13'. The members 13 may be suitably joined to the cable 12 by means of the intermediate connecting cables 14 in such a way as illustrated that when cable 12 is wound upon the member 15 by rotation of the wheel 16, the connecting members 13 will stretch the bed 10 in the direction shown by the arrows A—A. Similarly when the cable 11 is wound around the member 15' by rotation of the wheel 16', the connecting members 13' suitably joined to the cable 11 by the connecting cables 14' will stretch the bed in the direction of the arrows B—B. The shape of the bed 10 and the degree of stretch applied thereto may be controlled by the tension placed upon the cables 11 and 12.

In the operation of the invention the bed 10 may first be stretched in the direction of the arrows A—A to any desired extent, and when in stretched position a suitable mass of fluid plastic material containing a desired dispersed suspension of asymmetric particles may be applied to the bed in any desired manner, for example, by spraying, dipping, painting, or otherwise coating the bed. Before the fluid mass has had an opportunity to set or harden, the bed may be returned substantially to its original unstretched position and then stretched in the direction of the arrows B—B by tension applied to the cable 11. It is obvious that the order of the operations by which the bed 10 is stretched in a direction at right angles to the original direction of stretch is not important. The stretch in the direction of the arrows B—B, for example, might be applied before the stretch in the direction of the arrows A—A is relaxed providing the material of the bed will stand the strain.

While the stretch has been preferably described as first in one direction and then in a direction at right angles thereto, it is understood that a stretch in any direction which will orient or align the axes of the particles suspended in the fluid mass may be employed. It is further to be understood that it may be unnecessary to stretch the bed 10 in more than one direction. For example, if the bed is first stretched in the direction of the arrows A—A and the material comprising the asymmetric particles to be oriented is then applied and the bed is then relaxed or unstretched to its original position, the effect on the applied material is to cause an orientation of the particles with their axes tending to align at right angles to the original direction of stretch. An augmented effect is secured if the bed is then stretched in the direction of the arrows B—B. It will be obvious further that the material to be stretched may be applied to the bed when it is in relaxed or unstretched condition and orientation of the suspended particles may then be secured by stretching the bed in either direction.

It will be obvious that a maximum orientation will be obtained when the material applied to the bed has been stretched by both a relaxation of the bed from an original stretched position and a stretching of the bed in a direction at right angles to the original stretched position. It will be obvious further that when the material is applied to the bed while the bed is in a stretched condition, the material itself will be under no strain of any kind until the bed has been relaxed and that the relaxation or unstretching of the bed will impart to the material a stretching, but in a direction at right angles to the direction in which the bed was originally stretched. If then a further stretch is to be imparted to the applied material, it is necessary for maximum efficiency that the bed be stretched in a direction at right angles to its original direction of stretch.

After the applied fluid plastic material has been subjected to the desired stretch, it may be set or hardened while still in contact with the bed. After setting or hardening the material may be stripped from the bed in the form of a sheet in which the axes of the particles embedded in the suspending medium will have been oriented to substantial parallelism. After the material has first been applied to the bed, the stretching operations should be conducted only after the material has acquired a sufficient viscosity to react upon the suspended particles therein and to prevent said particles from returning to heterogeneous position in the mass. It will be obvious that the material may be applied to the bed under such conditions that it will be adapted for immediate treatment.

In Fig. 3 is shown a diagrammatic view illustrative of the heterogeneously dispersed condition of the particles in the suspending material at the time of application to the bed, and in Fig. 4 is shown a similar view illustrative of the aligned or oriented condition of the particles after the mass has been subjected to the process of the invention. In those figures 17 represents the suspending material and 18 the particles suspended therein.

The particles employed in the suspension must be asymmetric. They may be of any size. The suspending medium may be of any suitable material, provided only that it is operative to suspend the particles and to act upon them during the process.

Where a light-polarizing body is desired a suitable suspending medium may comprise nitrocellulose dissolved in any suitable non-solvent for the polarizing particles employed. Suitable polarizing particles may comprise needle-like particles of herapathite and other polarizing periodides. Where a polarizing body is to be produced it is of importance that the polarizing particles suspended in the medium be of the same variety. For example, herapathite crystals may occur in two modifications generally designated alpha and beta varieties. The polarizing axis of one variety lies along the geometric long axis of the particle while the polarizing axis of the other variety lies at right angles thereto. Care should be taken to employ only one variety.

Double refracting sheets may, if desired, be prepared by this method by employing double refracting particles instead of polarizing particles and by using a suitable suspending medium.

It will be obvious further that the process of this invention may be applied to viscous substances which may be set and which have chain-like molecules to effect an orientation of the molecules, irrespective of whether the substance may have suspended therein any additional asymmetric particles.

While one form of apparatus has been disclosed for applying a substantially uniform pure stretch to the treated material, the invention contemplates the use of any apparatus adapted to impart such a stretching action. For example, the material to be stretched may be affixed to a plurality of surfaces or edges which may thereupon be separated to stretch the material, or the material to be stretched may be affixed in part to a surface or edge and permitted to fall away therefrom, being stretched by its own weight.

Throughout the specification and claims reference to "stretch" will be deemed as including either any elongation of the material to effect an alteration in the positioning of particles suspended therein, or a contraction of the material to effect the same purpose, or a combination of the two actions. By "pure stretch" is meant a stretching action as defined, which is free from shear.

Since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In the process of orienting bodies of asymmetric contour, the steps which comprise applying a layer of a suspension of said bodies to a surface, and stretching said surface.

2. In the process of orienting bodies of asymmetric contour, the steps which comprise applying a layer of a suspension of said bodies to a surface, and extending said surface in one direction.

3. In the process of orienting bodies of asymmetric contour, the steps which comprise applying a layer of a suspension of said bodies to a surface, and contracting said surface in one direction.

4. In the process of orienting bodies of asymmetric contour, the steps which comprise applying a layer of a suspension of said bodies to a surface, contracting the surface in one direction to contract said layer, and extending the surface in a direction at right angles thereto to extend said layer.

5. The process which comprises introducing particles of asymmetric contour into a suspension, orienting said particles by subjecting said suspension to pure stretch, and setting said suspension.

6. In the process of orienting particles of asymmetric contour in a suspension, the steps which comprise applying said suspension to a surface and stretching said surface.

7. In the process of orienting particles of asymmetric contour in a suspension, the steps which comprise applying said suspension to a surface, and extending said surface in one direction.

8. In the process of orienting particles of asymmetric contour in a suspension, the steps which comprise applying said suspension to a surface, and contracting said surface in one direction.

9. In the process of orienting particles of asymmetric contour in a suspension, the steps which comprise applying said suspension to a surface, contracting said surface in one direction, and extending said surface in a direction at right angles thereto.

10. In the process of orienting particles of asymmetric contour which have been introduced into a suspension, the steps which comprise depositing said suspension on a support, affixing portions of said suspension to relatively movable elements, and contracting said suspension by moving one of said elements nearer to the other whereby the longitudinal axes of said particles tend to align.

11. In the process of orienting particles of asymmetric contour which have been introduced into a suspension, the steps which comprise affixing portions of said suspension to relatively movable elements, and stretching said suspension by moving one of said elements away from the other whereby the longitudinal axes of said particles tend to align.

12. The process of forming a polarizing body, which comprises forming a suspension of polarizing particles of asymmetric contour in a suspending medium, subjecting said suspension to substantially pure stretch, and setting said suspending medium.

13. The process of forming a polarizing body, which comprises forming a suspension of polarizing bodies of asymmetric contour in a suspending medium, applying said suspension to a surface, stretching said surface to orient the polarizing axes of said bodies, and setting said medium.

14. The process of forming a polarizing body, which comprises forming a suspension of polarizing bodies of asymmetric contour in a suspending medium, applying said suspension to a surface, extending said surface in one direction to orient the polarizing axes of said bodies, and setting said medium.

15. The process of forming a polarizing body, which comprises forming a suspension of polarizing bodies of asymmetric contour in a suspending medium, applying said suspension to a surface, contracting said surface in one direction to orient the polarizing axes of said bodies, and setting said medium.

16. The process of forming a polarizing body, which comprises applying a suspension of polarizing particles of asymmetric contour in a suspending medium to an extended surface, contracting said surface, extending said surface in a direction at right angles to the direction of its initial extension and setting said medium.

17. The process of forming a polarizing body which comprises applying a suspension of polarizing particles of asymmetric contour in a suspending medium to a surface, altering one dimension of said surface with respect to the dimension thereof at right angles thereto, whereby the shape of the applied suspension is altered and the bodies therein caused to align, and setting said suspension.

18. In the process of orienting particles of asymmetric contour, the steps which comprise applying a layer of a suspension of said bodies to a surface and altering one dimension of said surface with respect to the dimension thereof at right angles thereto to change the shape of the layer applied thereto and the position of the bodies therein, whereby said bodies are caused to align.

EDWIN H. LAND.